Patented May 22, 1934

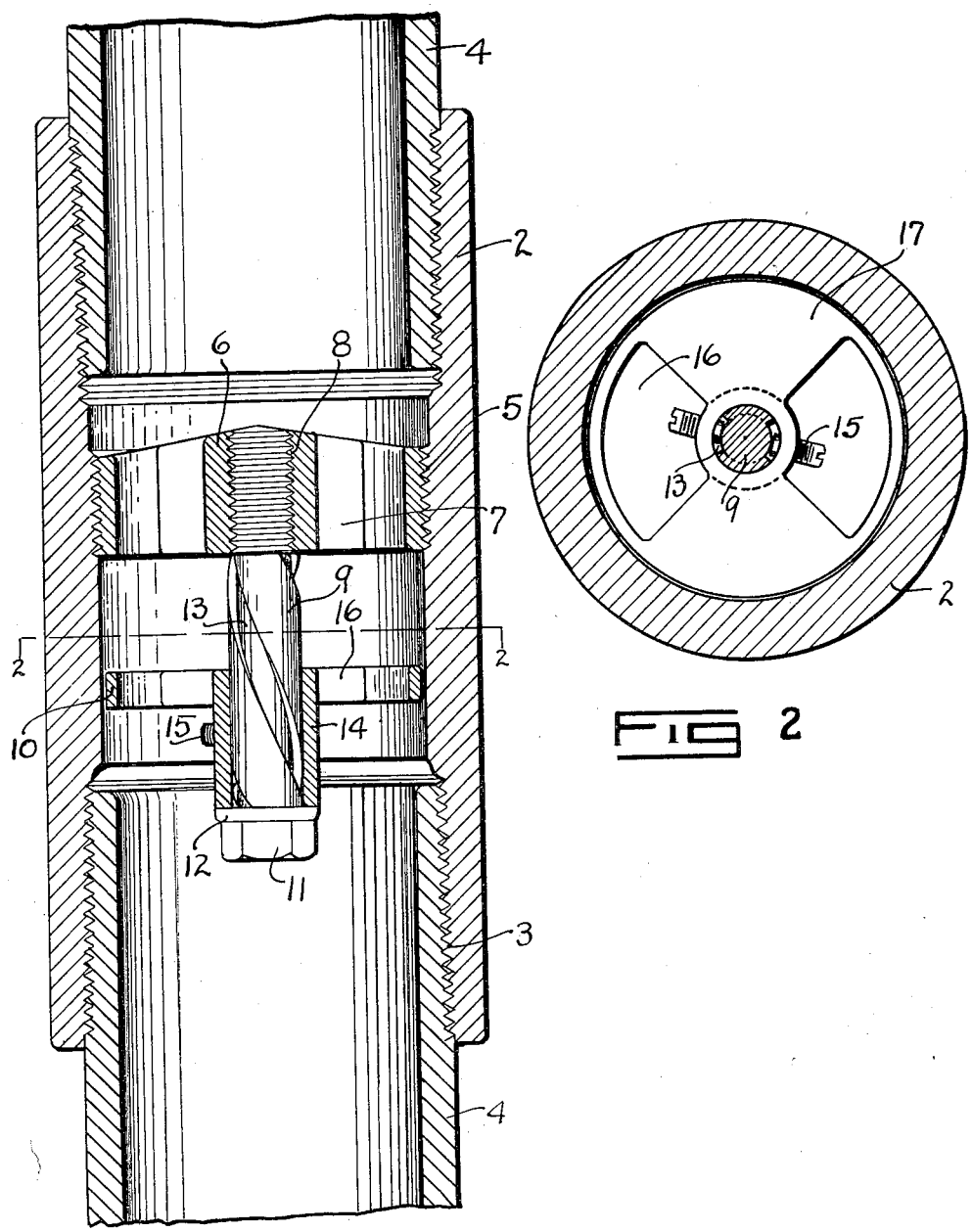

1,960,014

UNITED STATES PATENT OFFICE 1,960,014

FLOAT VALVE

Edwin Lloyd Johnston, El Dorado, Ark.

Application June 30, 1930, Serial No. 464,864

7 Claims. (Cl. 251—129)

My invention relates to valves for use in deep well operations for oil, water, gas and the like. It has particular application to valves which may be employed as float valves although the invention is not limited to this particular use.

In introducing a pipe into a well filled with liquid as in the setting of casing, or in introducing the drill stem into the well, it is sometimes desirable to prevent the entrance of liquid into the pipe which is being inserted into the well, so that said pipe may be buoyed up by the liquid, thus taking a large amount of weight off of the traveling block and the derrick. Float valves have previously been provided for this purpose which prevent the entrance of liquid from below but allow liquid to be pumped downwardly through the pipe when desired for washing the well and the like.

It is an object of my invention to provide a float valve of the character stated which closes positively to prevent the entrance of liquid to the pipe when it is introduced into the well, but which will easily open to provide a clear passage through the pipe when flushing of the well is desired.

It is also an object to provide a float valve which will permit the passage of a ball valve such as is sometimes desired when the float valve is used in connection with the drill stem comprising a core barrel at the forward end.

It is broadly the object of the invention to provide a valve in a fluid conducting pipe which will prevent the passage of fluid in one direction but which will automatically open to allow the passage of the liquid in the opposite direction.

In the drawing herewith, Fig. 1 is a longitudinal section through a section of pipe having my invention employed therein.

Fig. 2 is a transverse section on the plane 2—2 of Fig. 1.

I prefer to house my valve in a coupling or collar 2, which is shown as threaded internally at 3 adjacent each end for connection with a string of pipe 4. Said collar has its wall thickened between its ends and threaded at 5 to provide an attachment for a valve seat 6. Said seat is approximately disc-shaped with a plurality of arcuate openings 7 therein through which the fluid may pass. Said plate is beveled on its upper face from a central point downwardly toward each of the openings 7 so that if a ball is dropped downwardly from the surface it will be directed toward one or the other of the openings 7 through the inclination of the upper surface. Centrally of the seat plate is an opening threaded at 8 to provide attachment for a stem 9, which projects downwardly below the seat. The lower side of the plate 6 is flattened to provide a seat for the valve 10.

The stem or post 9 has a head 11 at its lower end, the upper end being threaded for engagement in the seat plate. I may use a washer 12 above the head to provide a stop member against which the valve may engage. The stem is provided with a spiral groove 13 therein to engage with said plate.

The valve plate or disc 10 has a central hub or bushing 14, the lower end of which normally rests by gravity upon the washer 12, said plate being in spaced relation below the seat. Said bushing has one or more set screws 15 extending through the bushing or hub 14 and projecting within the slot or slots 13 in the stem. This will be understood from Fig. 2. The valve plate which is at the upper end of the bushing 14 is disc-shaped and has a pair of opposite arcuate openings 16 therein corresponding with the openings 7 through the said plate.

When my device is introduced into the well the fluid in the well will tend to move upwardly into the pipe as the pipe is lowered. The force of the fluid thus tending to enter the pipe engages with the surface of the valve plate and moves it upwardly. As it is thus moved upwardly the plate is rotated due to the engagement of the set screws 15 with the grooves 13 in the stem, thus bringing the closed portion 17 of the plate over the openings 7 in the seat thereby closing the same and preventing the passage of liquid upwardly into the pipe. When the bottom of the well is reached, if it is a casing which is being lowered, the pumps will be started and water will be forced downwardly through said casing to wash the bottom of the well. When this is done the valve will be moved downwardly from its seat and as it moves downwardly it will be rotated to place the openings 16 in the plate opposite the openings 7 in the seat, thus allowing a free passage of liquid therethrough. If the device is used upon a core drill the pumping of liquid downwardly through the stem will tend to clean out the bottom of the well ready for taking of sample; and if it is then desired to close the upper end of the core barrel by means of the ball, as is common practice, the ball may be dropped downwardly through the drill stem and will engage upon the upper end of the valve seat 6 and will be directed through the openings 7 and 16 and may thus pass downwardly to the drill bit.

I have thus provided a float valve, which, when open, provides a clear passage of fluid past the valve, but which may be readily closed to entirely obstruct the passage of liquid through the pipe. The device is an exceptionally simple device not adapted to get out of order and which will function positively under all circumstances.

What I claim as new is:

1. A back pressure valve including a collar threaded for coupling in a pipe, a seat plate secured within said coupling and having fluid openings therein, a stem extending downwardly from said plate, a valve plate on said stem, means to limit the downward movement of said valve plate on said stem, said valve plate having openings adapted to align with said openings in said disc plate when said valve plate is at the lower end of said stem, and means to move said openings out of alignment with those in the seat plate when said valve plate is moved into contact with said seat plate.

2. A back pressure valve including a collar threaded for coupling in a pipe, a seat plate secured within said coupling and having fluid openings therein, a stem extending downwardly from said plate, a valve disc on said stem, means to limit the downward movement of said valve disc on said stem, said valve disc having openings adapted to align with said openings in said plate when said valve disc is at the lower end of said stem, and means on said valve disc engaging with said stem to rotate said disc openings out of alignment with the openings in said plate when said disc is moved upwardly on said stem.

3. A back pressure valve including a collar threaded for coupling in a pipe, a seat plate secured within said coupling and having fluid openings therein, a stem extending downwardly from said plate, a valve disc on said stem, means to limit the downward movement of said valve disc on said stem, said valve disc having openings adapted to align with said openings in said plate when said valve disc is at the lower end of said stem, said stem having spiral grooves therein, and means on said disc engaging in said grooves to rotate said openings in said disc out of alignment with the openings in said plate as said disc moves upwardly on said stem.

4. A back pressure valve including a tubular member, a valve seat secured therein and having fluid openings therethrough, a valve disc below said seat, a stem on which said disc is slidable, said disc having openings therein adapted to register with the openings in said seat when said valve is open, and means on said stem to cause the openings in the disc to move out of registration with the openings in said seat when said valve is moved to closed position.

5. A back pressure valve including a tubular member, a valve seat secured therein and having fluid openings therethrough, a valve disc below said seat, a stem on which said disc is slidable, said disc having openings therein adapted to register with the openings in said seat when said valve is open, and means on said stem to cause the openings in the disc to move out of registration with the openings in said seat when said valve is moved to closed position, the upper face of said seat being inclined toward said openings in the manner described.

6. A valve seat having openings therein and a plane lower face, a valve disc below said seat adapted to be spaced normally below said seat by fluid pressure and freely movable to closed position by fluid pressure, said disc having openings therein normally aligning with the said seat openings, means on said seat to limit the downward movement of said disc, and means to move the openings in said disc out of alignment with the openings of the said seat when said valve disc moves to closed position by the back pressure of the fluid against the valve disc.

7. A back pressure valve including a flat perforate seat, a flat perforate valve plate freely movable to close said seat against the passage of fluid in one direction when the perforations are out of alignment, means to support said plate, said means being of such length and direction that said plate by the force of gravity remains in open position, and connecting means between said first means and said plate whereby the plate is caused to rotate when moved by fluid flow to closed position to move the perforation out of alignment.

EDWIN LLOYD JOHNSTON.